US009306996B2

United States Patent
Tsai et al.

(10) Patent No.: US 9,306,996 B2
(45) Date of Patent: Apr. 5, 2016

(54) STREAMING CONNECTION MANAGEMENT METHOD AND STREAMING DATA CONNECTION SYSTEM

(71) Applicant: Industrial Technology Research Institute, Hsinchu (TW)

(72) Inventors: Yi-Hsing Tsai, Hsinchu County (TW); Jung-Kuang Hsu, Hsinchu (TW); Yun-Ei Wu, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 431 days.

(21) Appl. No.: 13/726,625

(22) Filed: Dec. 26, 2012

(65) Prior Publication Data

US 2014/0143396 A1    May 22, 2014

(30) Foreign Application Priority Data

Nov. 21, 2012   (TW) .............. 101143489 A (51) Int. Cl.
| | |
|---|---|
| H04L 29/06 | (2006.01) |
| H04N 21/6405 | (2011.01) |
| H04N 21/234 | (2011.01) |
| H04N 7/18 | (2006.01) |

(Continued)

(52) U.S. Cl.
CPC ............. *H04L 65/60* (2013.01); *H04L 65/4069* (2013.01); *H04L 65/4084* (2013.01); *H04L 65/80* (2013.01); *H04L 67/1002* (2013.01); *H04N 7/18* (2013.01); *H04N 7/181* (2013.01); *H04N 21/23418* (2013.01); *H04N 21/6405* (2013.01); *H04N 5/23206* (2013.01)

(58) Field of Classification Search
None
See application file for complete search history.

(56) References Cited

U.S. PATENT DOCUMENTS

| | | |
|---|---|---|
| 7,173,928 B2 | 2/2007 | Xu et al. |
| 7,257,837 B2 | 8/2007 | Xu et al. |
| 7,412,727 B2 | 8/2008 | Kim et al. |

(Continued)

FOREIGN PATENT DOCUMENTS

| | | |
|---|---|---|
| CN | 101282287 | 10/2008 |
| CN | 101951417 | 1/2011 |

(Continued)

OTHER PUBLICATIONS

Bastos et al., "Visual, Real-time Monitoring System for Remote Operation of Electrical Substations," IEEE/PES Transmission and Distribution Conference and Exposition: Latin America, Nov. 8-10, 2010, pp. 417-421.

(Continued)

*Primary Examiner* — Ranodhi Serrao
*Assistant Examiner* — James Fiorillo
(74) *Attorney, Agent, or Firm* — Jianq Chyun IP Office (57) ABSTRACT

A streaming connection management method and system are provided. In the streaming connection management method, a streaming source establishes a plurality of connecting requests through a first relay server, and the first relay server provides first streaming data. A number of connections established with the first relay server is determined. When the number of the connections established with the first relay server is greater than or equal to a first relay threshold of the first relay server, a data balance method is executed to obtain a second relay threshold. The first relay server is adjusted to provide a second streaming data, in which a pixel value of the first streaming data is greater than a pixel value of the second streaming data.

15 Claims, 7 Drawing Sheets

(51) Int. Cl.
*H04L 29/08* (2006.01)
*H04N 5/232* (2006.01)

(56) References Cited

U.S. PATENT DOCUMENTS

| | | | |
|---|---|---|---|
| 7,543,065 | B2 | 6/2009 | Barkley et al. |
| 7,848,274 | B2 | 12/2010 | Nishimura et al. |
| 7,953,090 | B2 | 5/2011 | Wei et al. |
| 7,983,254 | B2 | 7/2011 | Alt et al. |
| 8,171,148 | B2 | 5/2012 | Lucas et al. |
| 2004/0177151 | A1* | 9/2004 | Kryeziu ............ G06F 17/30017 709/233 |
| 2006/0136597 | A1* | 6/2006 | Shabtai ............. H04L 29/06027 709/231 |
| 2007/0097955 | A1 | 5/2007 | Li et al. |
| 2007/0147263 | A1 | 6/2007 | Liao et al. |
| 2010/0095014 | A1 | 4/2010 | Zuckerman et al. |
| 2010/0268832 | A1* | 10/2010 | Lucas ................. H04L 65/1043 709/228 |
| 2010/0293290 | A1* | 11/2010 | Arashin ................. H04L 12/66 709/232 |
| 2011/0072479 | A1* | 3/2011 | Hsu ........................ H04N 7/163 725/110 |
| 2011/0134993 | A1* | 6/2011 | Wu ..................... H04N 5/23206 375/240.2 |
| 2012/0127318 | A1* | 5/2012 | Song ..................... H04N 7/188 348/159 |
| 2012/0166582 | A1 | 6/2012 | Binder |
| 2012/0179742 | A1* | 7/2012 | Acharya ................. H04N 7/18 709/202 |
| 2013/0173819 | A1* | 7/2013 | Lee ................. H04N 21/23418 709/231 |
| 2013/0246631 | A1* | 9/2013 | Gonzales ........... H04N 21/6405 709/227 |
| 2014/0122656 | A1* | 5/2014 | Baldwin ............. H04L 65/4084 709/219 |

FOREIGN PATENT DOCUMENTS

| | | |
|---|---|---|
| CN | 102201976 | 9/2011 |
| CN | 102316168 | 1/2012 |
| TW | 200727652 | 7/2007 |
| TW | 201014272 | 4/2010 |
| TW | 201018154 | 5/2010 |
| TW | 201138415 | 11/2011 |
| WO | 2011020387 | 2/2011 |

OTHER PUBLICATIONS

He et al., "An Adaptive Algorithm for Real-Time Data Transmission in Multi-Hop Overlay Networks," 5th International ICST Conference on Communications and Networking in China (CHINACOM), Aug. 25-27, 2010, pp. 1-5.

Bestavros et al., "Osmosis: Scalable Delivery of Real-Time Streaming Media in Ad-Hoc Overlay Networks," Proceedings of the 23rd International Conference on Distributed Computing Systems Workshops, May 19-22, 2003, pp. 214-219.

Lu et al., "Classification-Based Relay Selection for Video Streaming Over Wireless Multihop Networks," ICME'09 Proceedings of the 2009 IEEE international conference on Multimedia and Expo, Mar. 2009, pp. 758-761.

Adamou et al., "Video Streaming with Network Coding and Opportunistic Relay in Wireless Mesh Networks," 33rd IEEE Conference on Local Computer Networks, Oct. 14-17, 2008, pp. 572-573.

Pei et al., "Joint Bandwidth-Aware Relay Placement and Routing in Heterogeneous Wireless Networks," IEEE 17th International Conference on Parallel and Distributed Systems (ICPADS), Dec. 7-9, 2011, pp. 420-427.

"Office Action of Taiwan Counterpart Application," issued on Feb. 6, 2015, p. 1-p. 4, in which the listed references were cited.

* cited by examiner

| Streaming relay server address | Encoder | Start time | Period | Maximum number of connecting requests | Number of connections | Number of added connections | Decrease frame number |
|---|---|---|---|---|---|---|---|
| 140.96.88.100 | MPEG-4 | 2012-04-16T 09:30:17Z | P23DT23H | 200 | 200 | 50 | 6 |
| 89.196.184.95 | H.264 | 2012-04-19T 15:13:57Z | PT12H30M5S | 300 | 50 | 0 | 0 |
| 202.26.145.25 | H.264 | 2012-04-23T 10:26:42Z | PT24H18M47S | 125 | 100 | 0 | 0 |
| ⋮ | ⋮ | ⋮ | ⋮ | ⋮ | ⋮ | ⋮ | ⋮ |
| 175.63.87.70 | M-JPEG | 2012-04-30T 20:18:22Z | PT118M17S | 400 | 20 | 0 | 0 |

STREAMING CONNECTION MANAGEMENT METHOD AND STREAMING DATA CONNECTION SYSTEM

CROSS-REFERENCE TO RELATED APPLICATION

This application claims the priority benefit of Taiwan application serial no. 101143489, filed on Nov. 21, 2012. The entirety of the above-mentioned patent application is hereby incorporated by reference herein and made a part of this specification.

TECHNICAL FIELD

The disclosure relates to a streaming connection management and a streaming data connection system capable of effectively using streaming relay servers.

BACKGROUND

Related Art

Current monitoring systems mainly include closed circuit televisions (CCTVs) and Internet protocol cameras (IP-CAMs), and the IPCAMs gradually become a mainstream of the whole surveillance industry. The IPCAM mainly applies two international standards of open network video interface forum (ONVIF) and physical security interoperability alliance (PSIA). The IPCAM can provide a media streaming service to a plurality of user equipments (UEs) through a network, and the UEs can be a content management system (CMS), a storage server or a general personal computer (PC).

The number and quality of the UEs that can be connected to the IPCAM are determined by internal hardware performance of the IPCAM, though when the number of the connected UEs is greater than an acceptable threshold range of the IPCAM, a problem is probably occurred, for example, unable to connect, packet loss, video play discontinuously, disconnect or system failure, etc. According to two main solutions, one is to restart the IPCAM, however, after the IPCAM is restarted, connections of most of the UEs still have a limitation of first system login first service access, so that the problem still cannot be resolved. Another solution is to use a higher order IPCAM hardware, though excess of the number of the UEs cannot be truly resolved, which only delays a timing of problem occurrence.

SUMMARY

The disclosure provides a streaming connection management method, in one embodiment, the streaming connection management method includes following steps. A streaming source establishes a plurality of connecting requests through a first relay server, and the first relay server provides first streaming data. A number of connections established with the first relay server is determined. When the number of the connections established with the first relay server is greater than or equal to a first relay threshold of the first relay server, a data balance method is executed to obtain a second relay threshold. The first relay server is adjusted to provide second streaming data, and a pixel value of the first streaming data is greater than a pixel value of the second streaming data.

The disclosure provides a streaming data connection system including a streaming source and a first relay server. In the streaming data connection system, the streaming source establishes a plurality of connecting requests through the first relay server, and the first relay server provides first streaming data. When the streaming source receives at least another connecting request or a plurality of connecting requests, connections with the first relay server are established according to the connecting requests. When a number of the connections established with the first relay server is greater than or equal to a first relay threshold of the first relay server, a data balance method is executed to obtain a second relay threshold. The first relay server is adjusted to provide second streaming data, and a pixel value of the first streaming data is greater than a pixel value of the second streaming data.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

One of some embodiments of the disclosure provides a streaming connection management method and a streaming data connection system. In the method, according to a number of connecting requests of user equipments (UEs), a streaming source is effectively used to establish connections with a relay server, by which adequate streaming data is provided to the UEs without influencing a connection quality.

In the embodiment of the disclosure, by using the streaming source to establish connections with the relay server, the number of acceptable connecting requests of the UEs is effectively increased, and streaming data is output to each of the UEs. Based on connecting requests and a streaming data balance method, streaming data with a low pixel value is output, so as to decrease necessity of additionally establishing a connection with another relay server.

An embodiment is provided below for descriptions, though the disclosure is not limited thereto.

Figure 1:
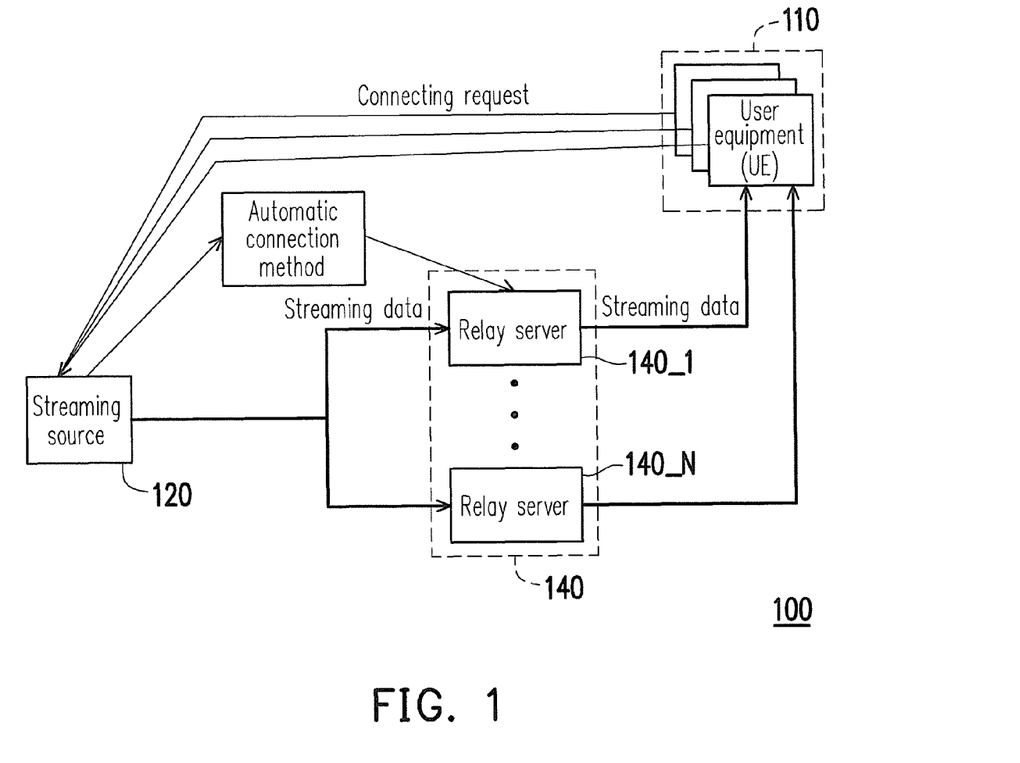
FIG. 1 is a block schematic diagram of a data connection system according to an embodiment of the disclosure.

FIG. 1 is a block schematic diagram of a data connection system according to an embodiment of the disclosure. Referring to FIG. 1, the data connection system 100 includes user equipment 110, a streaming source 120 and relay servers 140. The UEs 110 transmits connecting requests to the streaming source 120 through, for example, the Internet. If the number of current connecting requests of the streaming source 120 does not exceed a maximum load thereof or a maximum number of connections whereto the streaming source 120 provides services, the streaming source 120 receives the connecting requests of the UEs 110, and directly transmits back streaming data packets required by the UEs 110. The streaming source 120 may provide a streaming data format required by the UEs 110. For example, one of MPEG-4, H.264 and M-JPEG, etc., though the disclosure is not limited thereto.

However, when the streaming source 120 determines that the number of the current connections exceeds the maximum number (for example, a threshold as designed) of connections whereto the streaming source 120 provides services, the streaming source 120 dispatches the connecting requests of the UEs 110 to a relay server 140_1 in the relay servers 140 through an automatic connecting method, so as to provide the streaming data to the UEs 110. If the number of connections of the relay server 140_1 also exceeds a maximum number of connections whereto the relay server 140_1 provides services, the relay server 140_1 may execute a data balance method to adjust the maximum number of connections whereto the relay server 140_1 provides services. One of embodiments for the relay server 140_1 to increase the number of connections the relay server 140_1 may provide services is to decrease a pixel value or a frame data amount of the streaming data to be output to the UEs 110, and the threshold may be used as a base.

For example, the maximum number of connections of the relay server 140_1 is 300, once the current number of the connecting requests of the UEs 110 exceeds the maximum number of connections, the streaming data is adjusted from a high resolution to a low resolution to increase the maximum number of connections from 300 to 350. In this way, the number of additional connections 50 of the relay server 140_1 may serve as a buffer connection number of the connecting requests of the UEs 110.

In one of some embodiments, the aforementioned data balance method may be implemented according to a following equation:

$$(\text{Relay}_{ReqMax} + \text{Relay}_{AdditionReq}) * (30 - \text{Relay}_{ReduceFrame})$$

Where, $\text{Relay}_{ReqMax}$ is a maximum number of the connecting requests capable of being handled by the relay server. $\text{Relay}_{AdditionReq}$ is a number of connecting requests additionally increased by the relay server. $\text{Relay}_{ReduceFrame}$ is a number of frames reduced by the relay server. In the present embodiment, general streaming data may have a better display effect in 30 frames per second (fps), and has a basic display effect in 15 fps. If $\text{Relay}_{ReduceFrame} > 15$, it represents that the relay server cannot handle the connecting request of the UEs 110 under a basic frame number, and it is required to establish a connection with another relay server, so as to handle the connecting requests of the UEs 110.

Referring to FIG. 1, if the number of the connecting requests is still greater than the threshold of the connecting requests that can be accepted by the relay server 140_1, the connecting requests of the UEs 110 are dispatched, and a connection with another relay server 140_N is established to respectively output the streaming data to the UEs 110. For example, it is assumed that the maximum number of connections of the relay server 140_1 is 300. When the current number of the connecting requests of the UEs 110 is greater than the maximum number of connections of the relay server 140_1 if the relay server 140_1 accepts a sequential connecting request or more requests simultaneously, and the maximum number of connections of the relay server 140_1 will be adjusted and be changed to 350 after the data balance method is performed. If the number of connecting request of the UEs 110 is continually increased, for example, one connecting request is added, which exceeds the increased maximum number of connections of the relay server 140_1, the streaming source 120 establishes a connection with the relay server 140_N and dispatches the increased number of connections 50 to the relay server 140_N. The maximum number of connections of the relay server 140_1 is recovered to 300. Now, the streaming data transmitted to the UEs 110 by the relay servers 140_1 and 140_N is recovered from the low resolution streaming data to the original high resolution streaming data. In the present embodiment, only the relay servers 140_1 and 140_N are taken as an example for descriptions, though the disclosure is not limited thereto.

Figure 2:
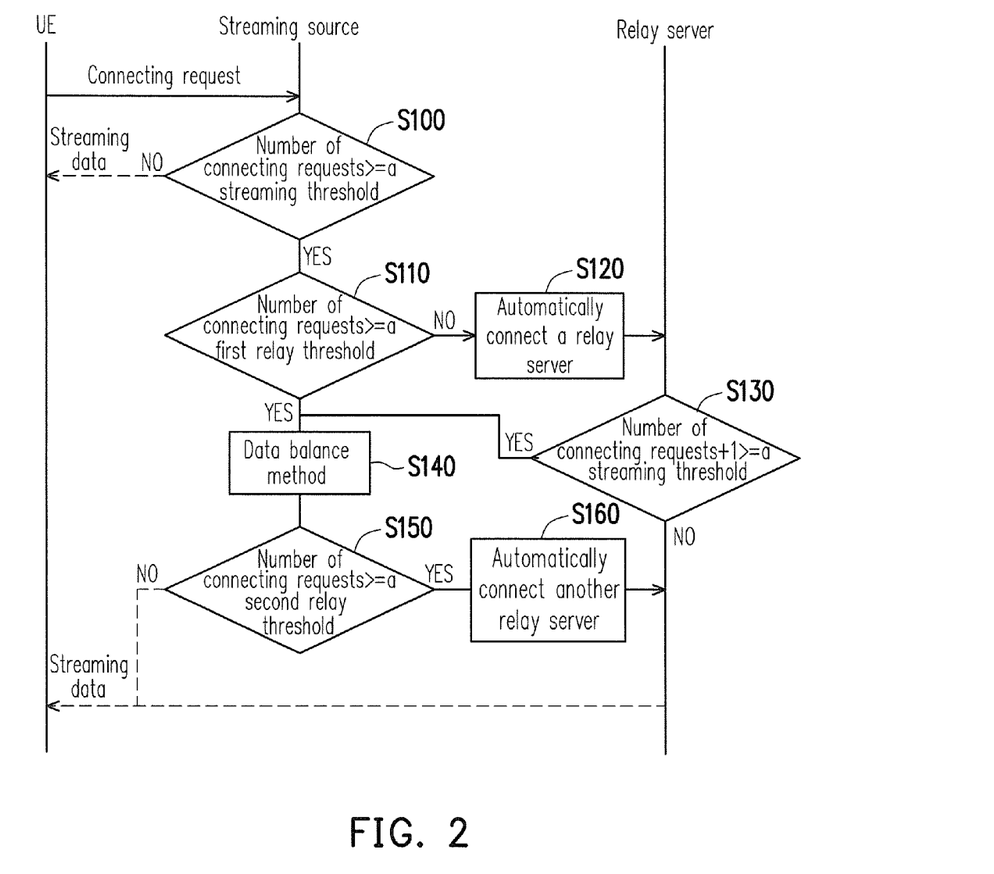
FIG. 2 is a flowchart illustrating a streaming connection management method according to an embodiment of the disclosure.

FIG. 2 is a flowchart illustrating a streaming connection management method according to an embodiment of the disclosure. FIG. 2 may be described with reference of related descriptions of FIG. 1. Referring to FIG. 2, after a streaming source receiving the connecting requests from UEs, the streaming source determines whether a number of the connecting requests is greater than a streaming threshold (step S100). The streaming threshold is a threshold determined by the streaming source, for example, the streaming threshold may be a number that the streaming source provides the streaming data of the UEs which have requested for service. If the number of the connecting requests of the UEs is smaller than the streaming threshold, the streaming source handles the connecting requests and transmits streaming data to the UEs. If the number of the connecting requests of the UEs is greater than the streaming threshold, the streaming source further determines whether the number of the connecting requests of the UEs is greater than a first relay threshold of the relay server (step S110). The first relay threshold is, for example, the maximum number of connections of the relay server or other predetermined number of connections as desired. If the number of the connecting requests of the UEs is greater than the first relay threshold, the streaming source directly performs the data balance method (step S140). If the number of the connecting requests of the UEs is smaller than the first relay threshold, the streaming source executes the automatic connecting method to establish a connection with a relay server (step S120). When the streaming resource establishes the connection with the relay server, it transmits streaming data required by the UEs and the data related to the UEs to the relay server, and the relay server outputs the same to the UE.

When the streaming source further receives the connecting request from the UEs, for example, one connecting request is added, the streaming resource again determines whether the number of the connecting requests is greater than the first relay threshold (step S130). If the number of the connecting requests added by one is smaller than the first relay threshold, the relay server directly transmits the streaming data to the UEs. If the number of the connecting requests added by one is greater than the first relay threshold, the relay server executes the data balance method to obtain a second relay threshold and streaming data with a lower pixel value. In an embodiment, the number of acceptable connecting requests of the second relay threshold is greater than the number of acceptable connecting requests of the first relay threshold. Since the relay server adjusts a resolution of the streaming data transmitted to the connected UEs, for example, from a high resolution to a low resolution, the second relay threshold may be obtained through the adjustment, i.e. the relay server can increase the number of connections to serve as a buffer connection number of the increased connecting requests of the UEs. In one embodiment, the data balance method of the embodiment may be the same to the data balance method of FIG. 1, so that details thereof are not repeated.

Finally, the streaming source determines whether the number of the connecting requests of the UEs is greater than the second relay threshold (step S150). If the number of the connecting requests of the UEs is smaller than the second relay threshold, the stream source transmits the streaming data with lower pixel value to the UEs through the relay server. If the number of the connecting requests of the UEs is still greater than the second relay threshold, the streaming source again executes the automatic connecting method to establish a connection with another relay server (step S160), so as to transmit the streaming data to the UEs through the other relay server. Now, the streaming data transmitted to the UEs 110 by the relay servers 140_1 and 140_N is recovered from the low resolution streaming data to the original high resolution streaming data.

Figure 3:
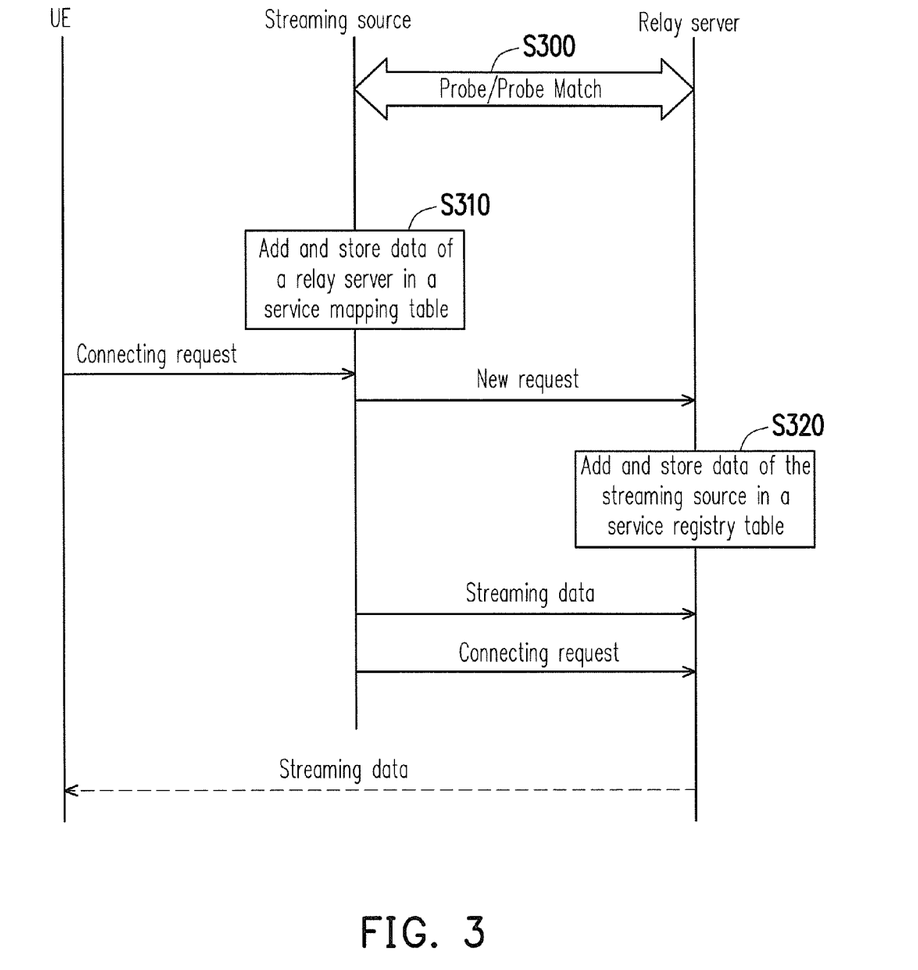
FIG. 3 is a flowchart illustrating an automatic connecting method according to an embodiment of the disclosure.

FIG. 3 is a flowchart schematically illustrating an automatic connecting method according to an embodiment of the disclosure. The streaming source performs an identity confirmation process with a relay server to be connected (step S300). The identity confirmation process is an initialization process or an event triggered by a request from UE. The streaming source first notifies all of the relay servers a type or a range of the relay servers required by the streaming source by multicast to probe any suitable relay servers, and selects the most suitable relay server from the relay servers which reply the probe match information by unicast. The streaming source then receives related information of the type and the range of the selected relay server. After receiving the related information of the selected relay server, the stream source decides whether more related information of the relay server are required, for example, these related information includes an Internet protocol (IP) address, a name, a uniform resource locator (URL) or a function, etc., though the disclosure is not limited thereto.

After the streaming source performs the identity confirmation process with the relay server to be connected, the streaming source adds and stores the related data of the relay servers to be connected in a service mapping table (step S310). Similarly, the relay server also adds and stores related information of the streaming source such as the IP address, name, URL or function in a service registry table (step S320). The streaming source starts to send streaming data packets to the relay server and send the connecting requests transmitted by a plurality of UEs and IPs of the UEs to the relay server to be connected. Finally, the relay server transmits the streaming data packets to the UEs according to the received connecting requests and the IPs of the UEs.

Figure 4:
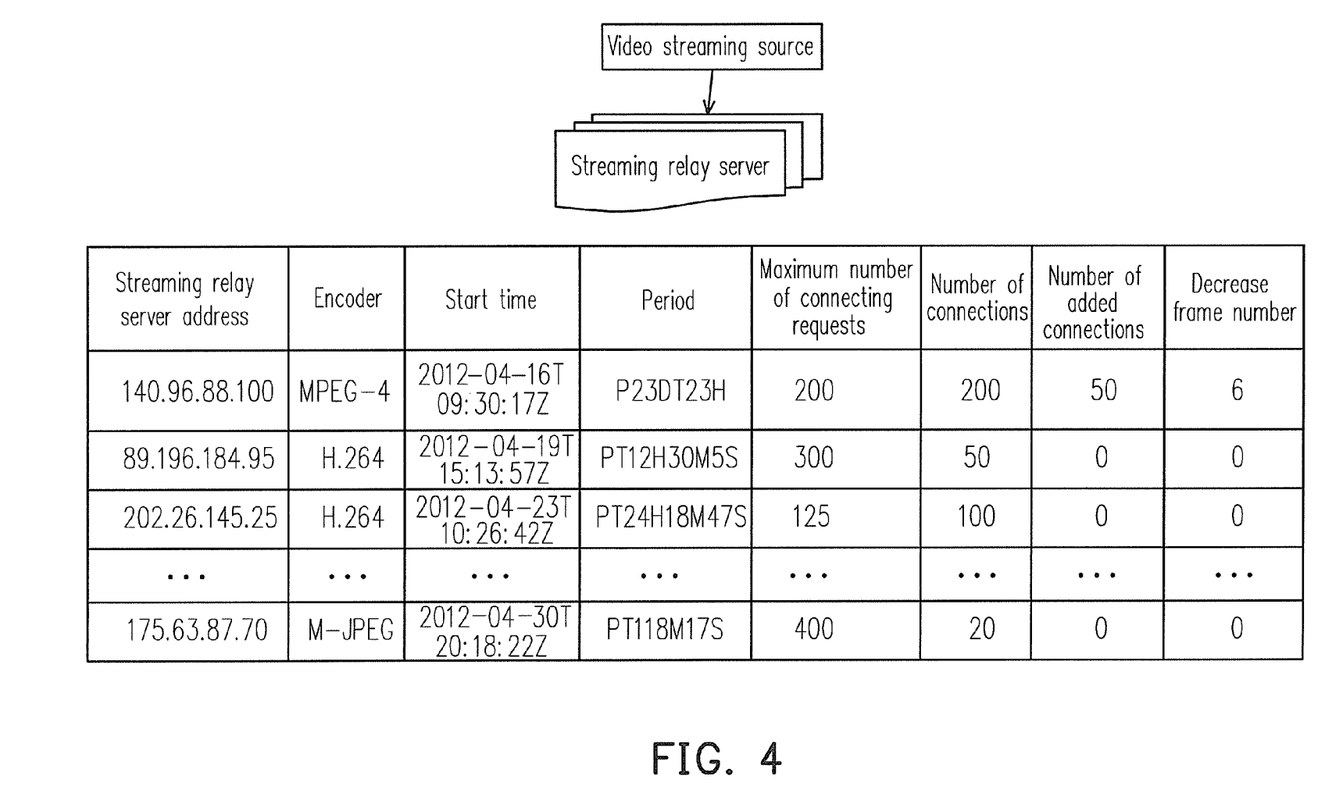
FIG. 4 is a schematic diagram of a service mapping table according to an embodiment of the disclosure.

FIG. 4 is a schematic diagram of a service mapping table according to an embodiment of the disclosure. The streaming source adds and stores the related data of the relay servers to be connected in the service mapping table. The service mapping table, for example, includes information such as server addresses, types of encoders (MPEG-4, H.264 and M-JPEG, etc.), start time, periods (number of days, number of hours, or number of seconds), maximum number of connecting requests, number of connections, number of added connections, and number of reduced frame transmissions, etc. of the relay servers.

Figure 5:
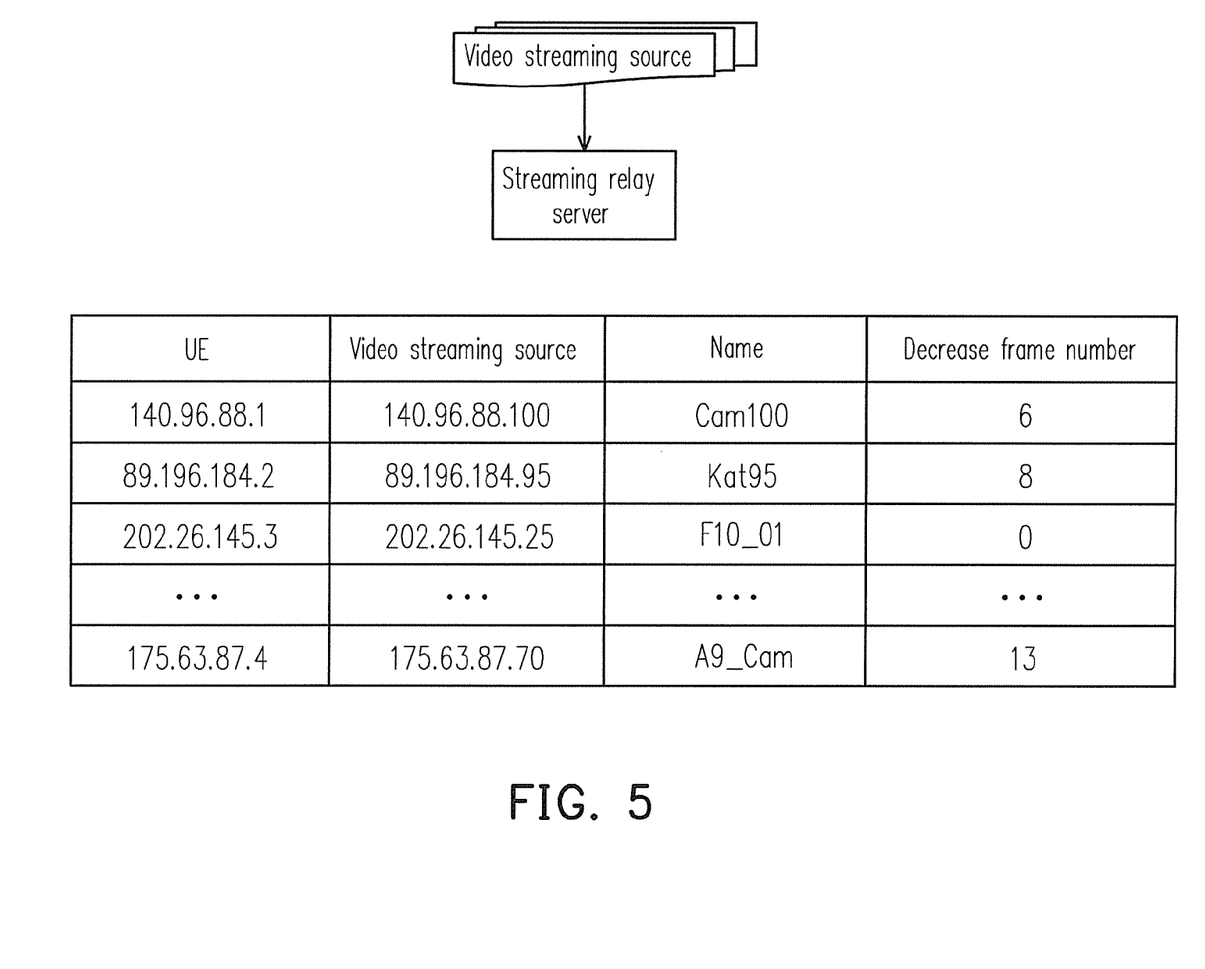
FIG. 5 is a schematic diagram of a service registry table according to an embodiment of the disclosure.

FIG. 5 is a schematic diagram of a service registry table according to an embodiment of the disclosure. The service registry table is stored in the relay server. The service registry table includes information of the UEs, IP address of the streaming source, number of the reduced frames, URL or functions, etc.

Figure 6A:
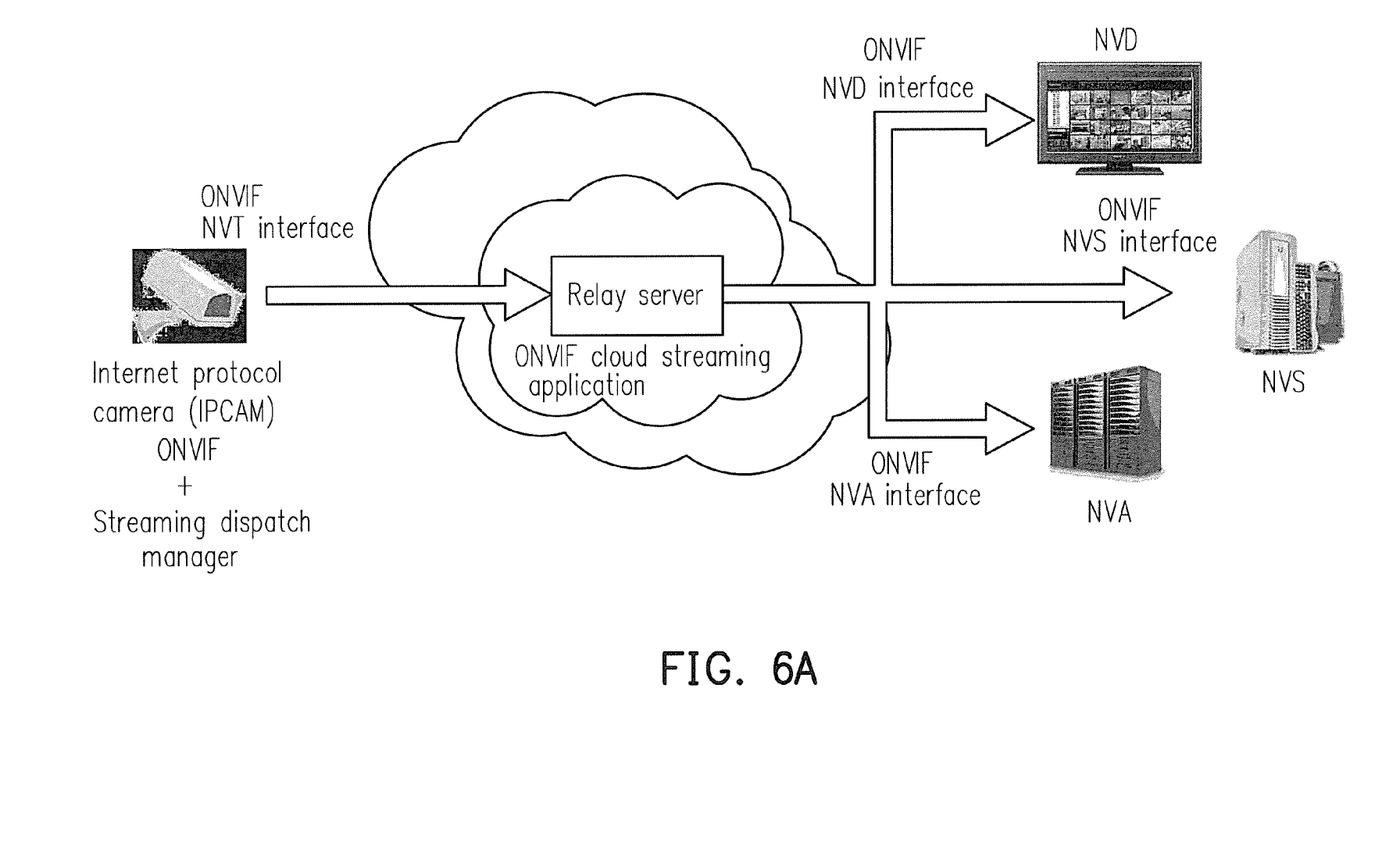
FIGS. 6A-6B are schematic diagrams of a streaming connection management method and system established under a structure of an open network video interface forum (ONVIF) used in an Internet protocol camera (IPCAM) according to an embodiment of the disclosure.
Figure 6B:
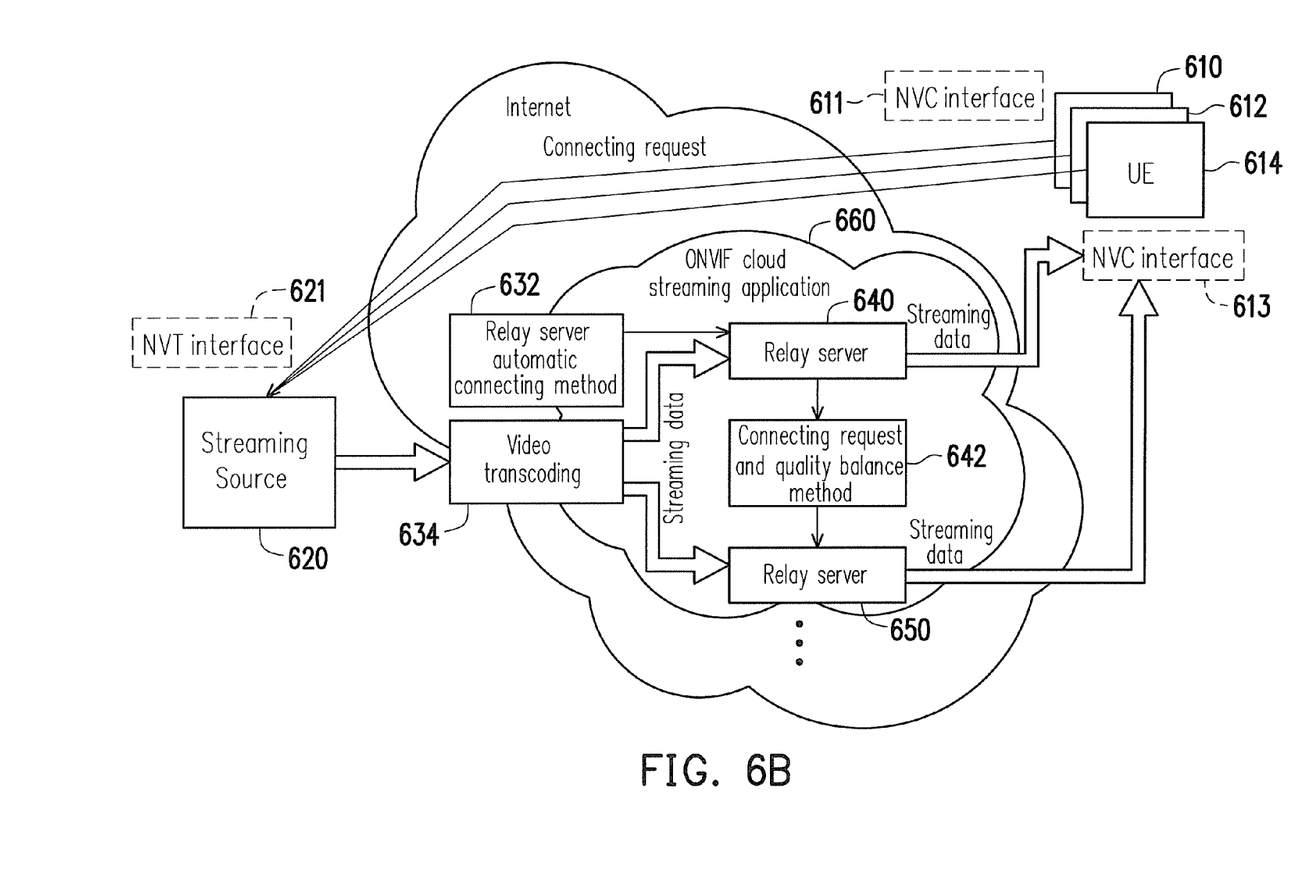

FIGS. 6A-6B are schematic diagrams of the streaming connection management method and system established under a structure of an open network video interface forum (ONVIF) used in an Internet protocol camera (IPCAM) according to an embodiment of the disclosure.

Referring to FIG. 6A, the ONVIF is a network video monitoring system standard, in a standard network video monitoring system device defined according to an ONVIF 2.1.1 specification, the ONVIF may include a network video transmitter (NVT), a network video storage (NVS), a network video analyzer (NVA) or a network video display (NVD), etc. The streaming connection management method can also be applied to a closed circuit television (CCTV) structure.

The IPCAM complied with the ONVIF standard may at least include a streaming dispatch manager, which is used for managing requests and dispatch of the connections. The relay server can transmit the streaming data to the NVD, the NVS or the NVA complied with the ONVIF standard.

Referring to FIG. 6B, which is described with reference of the structure of FIG. 6A. One of the UEs 610, 612 or 614 transmits a connecting request to a video streaming source 620 through an NVC interface 611 and an NVT interface 621. After the video streaming source 620 receives the connecting request, the video streaming source 620 first determines whether the number of the connecting requests is greater than a streaming threshold, and if the number of the connecting requests currently handled by the video streaming source 620 is smaller than a predetermined value, for example, the streaming threshold, the video streaming source 620 handles the connecting requests and transmits the streaming data to the UEs that send the connecting requests.

If the number of the connecting requests currently handled by the video streaming source 620 is greater than the streaming threshold, i.e. greater than the number of streaming connections that can be handled by the video streaming source 620, the video streaming source 620 further determines whether the number of the connecting requests is greater than a first relay threshold of a relay server 640.

If the number of the connecting requests is smaller than the first relay threshold, the video streaming resource 620 executes an automatic connecting method 632 of a relay server to establish a connection with the relay server 640. When the video streaming source 620 establishes the connection with the relay server 640, it transmits the streaming data required by the UE and related data of the UE to the relay server 640. The streaming data is further transformed into a format complied with a UE requirement through video transcoding 634, and is transmitted to the relay server 640. The relay server 640 outputs the same to the UE (for example, one of the UEs 610, 612 or 614) through the NVC interface. If the number of the connecting requests of the UEs is greater than the first relay threshold, the video streaming source 620 performs the data balance method, i.e. a connecting request and quality balance method 642 shown in FIG. 6B.

When the video streaming source 620 further receives a connecting request transmitted from a UE, for example, one connecting request is added, the video streaming source 620 again determines whether the number of the connecting requests established with the relay server 640 is greater than the first relay threshold, so as to determine whether to use the data balance method. If the number of the connecting requests of the UEs added by one is smaller than the first relay threshold, the relay server 640 directly transmits the streaming data to the UEs. If the number of the connecting requests of the UEs added by one is greater than the first relay threshold, the relay server 640 executes the data balance method, i.e. the connecting request and quality balance method 642 to obtain a second relay threshold and streaming data with a lower pixel value. In an embodiment, the number of the acceptable connecting requests of the second relay threshold is greater than the number of the acceptable connecting requests of the first relay threshold. The data balance method of the present embodiment can be the same to the data balance method of FIG. 1, which is not repeated.

Finally, the video streaming source 620 determines whether the number of the connecting requests of the UEs is greater than the second relay threshold of the relay server 640. If the number of the connecting requests of the UEs is smaller than the second relay threshold, the video stream source 620 transmits the streaming data with lower pixel value to the UEs through the relay server 640. If the number of the connecting requests of the UEs is still greater than the second relay threshold, the video streaming source 620 again executes the automatic connecting method to establish a connection with another relay server 650, so as to transmit the streaming data to the UEs through the other relay server.

In summary, it is determined whether the streaming source requires establishing a connection with the relay server according to the number of the connecting requests of the UEs. If the number of the connecting requests of the UEs executes the threshold of the streaming source, it is further determined whether the number of the connecting requests of the UEs exceeds the threshold of the relay server. If the number of the connecting requests of the UEs exceeds the threshold of the relay server, the connection with one of the relay servers is established. If the number of the connecting requests added by one also exceeds the threshold of the relay server, the output quality of the streaming data is decreased to increase the threshold of the acceptable connecting requests of the relay server. If the number of the connecting requests still exceeds the threshold, connection with another relay server is further established. In this way, a most efficient manner can be used to handle the connecting requests of the UEs and transmit the streaming data, so as to decrease necessity of additionally establishing a connection with another relay server.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A streaming data connection system comprising:
one or more User Equipment (UE) for receiving streaming data through a network;
one or more streaming sources comprising a processor configured to perform the function of streaming source generating;
a first relay server, wherein the one or more streaming sources receives at least one connection request from the one or more UEs and establishes a plurality of connecting requests through the first relay server, and the first relay server provides first streaming data to the UEs, wherein when a number of the connections established with the first relay server is greater than or equal to a first relay threshold of the first relay server, a data balance is executed to obtain a second relay threshold, wherein the first relay server is adjusted to provide second streaming data to the UEs, and a pixel value of the first streaming data is greater than a pixel value of the second streaming data, wherein before the one or more streaming sources establishes the connecting requests through the first relay server, it is further determined whether to execute an automatic connection according to the number of the connecting requests received by the one or more streaming sources exceeding a streaming threshold maintained by the streaming sources, wherein when it is determined to execute the automatic connection, selecting the first relay server from a plurality of relay servers wherein the connecting requests are dispatched to the first relay server to establish connections with the UEs; and
a second relay server, wherein when the number of the connections established with the first relay server is greater than or equal to the second relay threshold of the first relay server, the streaming sources establishes other subsequent connecting requests through the second relay server, and the first relay server dispatches the connections corresponding to a difference of the second relay threshold and the first relay threshold to the second relay server, and the first relay server is recovered to provide the first streaming data to the UEs.

2. The streaming data connection system as claimed in claim 1, wherein the one or more streaming sources receives the connecting requests through an open network video interface forum (ONVIF) interface.

3. The streaming data connection system as claimed in claim 2, wherein the connecting request is transmitted by the user equipment (UE) of a standard network video monitoring system complied with ONVIF specification.

4. The streaming data connection system as claimed in claim 3, wherein the user equipment (UE) comprises one of a network video transmitter (NVT), a network video storage (NVS), a network video analyzer (NVA) and a network video display (NVD).

5. The streaming data connection system as claimed in claim 2, wherein the one or more streaming sources is an Internet protocol camera (IPCAM).

6. The streaming data system as claimed in claim 1, wherein the automatic connection is performed by the one or more streaming sources, and the one or more streaming sources is further configured to perform operations of:
the one or more streaming sources performing an identify data confirmation with the first relay server;
adding and storing information of the first relay server to a service mapping table; and
adding and storing information of the one or more streaming sources to a service registry table.

7. The streaming data connection system as claimed in claim 1, wherein the data balance is performed by the one or more streaming sources, and the one or more streaming sources is further configured to perform operations of:
changing a frame rate of the first streaming data to output the second streaming data; and
changing the first relay threshold into the second relay threshold, wherein the second relay threshold is greater than the first relay threshold.

8. The streaming data connection system as claimed in claim 1, wherein the one or more streaming sources is a unit complied with a closed circuit television (CCTV) system.

9. A streaming connection management method, comprising:
receiving by a streaming source, at least one connection request from one or more User Equipment (UE) through a network;
determining whether to execute an automatic connecting method according to the number of connecting requests received by the streaming source exceeding a streaming threshold maintained by the streaming source, and wherein when it is determined to execute the automatic connecting method, selecting a first relay server from a plurality of relay servers wherein the connecting requests are dispatched to the first relay server to establish connections with the one or more UEs;

establishing a plurality of connecting requests by the streaming source through the first relay server, and providing a first streaming data by the first relay server to the UEs; and determining a number of connections established with the first relay server, wherein when the number of the connections established with the first relay server is greater than or equal to a first relay threshold of the first relay server, a data balance method is executed to obtain a second relay threshold, wherein the first relay server is adjusted to provide second streaming data to the UEs, wherein a pixel value of the first streaming data is greater than a pixel value of the second streaming data, and wherein when the number of the connections established with the first relay server is greater than or equal to the second relay threshold of the first relay server, the streaming source establishes other subsequent connecting requests through a second relay server, and the first relay server dispatches the connections corresponding to a difference of the second relay threshold and the first relay threshold to the second relay server, and the first relay server is recovered to provide the first streaming data to the UEs.

10. The streaming connection management method as claimed in claim 9, wherein the streaming source receives the connecting requests through an open network video interface forum (ONVIF) interface.

11. The streaming connection management method as claimed in claim 10, wherein the connecting request is transmitted by the user equipment (UE) of a standard network video monitoring system complied with an ONVIF specification.

12. The streaming connection management method as claimed in claim 11, wherein the user equipment comprises one of a network video transmitter (NVT), a network video storage (NVS), a network video analyzer (NVA) and a network video display (NVD).

13. The streaming connection management method as claimed in claim 10, wherein the streaming source is an Internet protocol camera (IPCAM).

14. The streaming connection management method as claimed in claim 9, wherein the automatic connecting method comprises:

the streaming source performing an identify data confirmation with the first relay server;

adding and storing information of the first relay server to a service mapping table; and adding and storing information of the streaming source to a service registry table.

15. The streaming connection management method as claimed in claim 9, wherein the data balance method comprises:

changing a frame rate of the first streaming data to output the second streaming data; and changing the first relay threshold into the second relay threshold, wherein the second relay threshold is greater than the first relay threshold.

* * * * *